United States Patent [19]

Gutman et al.

[11] Patent Number: 4,774,002
[45] Date of Patent: Sep. 27, 1988

[54] LIQUID TREATMENT SUCH AS DEWATERING OF SLUDGE

[75] Inventors: Richard G. Gutman; Gwilyn H. Williams, both of Oxford, England

[73] Assignee: British Nuclear Fuels Public Limited Company, Risley, England

[21] Appl. No.: 914,325

[22] Filed: Oct. 2, 1986

[30] Foreign Application Priority Data

Oct. 10, 1985 [GB] United Kingdom ............ 8524972

[51] Int. Cl.$^4$ .................. B01D 13/00; B01D 37/04
[52] U.S. Cl. .................. 210/636; 210/741; 210/805; 210/751; 210/97; 210/195.2
[58] Field of Search .......... 210/137, 195.2, 321.1, 210/433.2, 636, 637, 741, 805, 751, 90, 97, 108, 109, 321, 69, 196

[56] References Cited

U.S. PATENT DOCUMENTS

| | | | |
|---|---|---|---|
| 3,794,169 | 2/1974 | Sisk et al. | 210/140 |
| 3,846,295 | 11/1974 | Gibbs. | |
| 3,950,249 | 4/1976 | Eger et al. | 210/104 |
| 3,992,301 | 11/1976 | Shippey et al. | 210/636 |
| 4,113,504 | 9/1978 | Chen et al. | 210/751 X |
| 4,113,614 | 9/1978 | Rollo et al. | 210/647 |
| 4,191,182 | 3/1980 | Popovich et al. | 210/90 |
| 4,420,398 | 12/1983 | Castino | 210/195.2 |
| 4,487,689 | 12/1984 | Galaj | 210/195.2 |

FOREIGN PATENT DOCUMENTS

| | | | |
|---|---|---|---|
| 0065442 | 11/1982 | European Pat. Off. | 210/321.2 |
| 0079040 | 5/1983 | European Pat. Off. | 210/321.2 |
| 2180446 | 11/1973 | France. | |
| 1466094 | 3/1977 | United Kingdom. | |
| 1468928 | 3/1977 | United Kingdom. | |
| 1502859 | 3/1978 | United Kingdom. | |
| 1558603 | 1/1980 | United Kingdom. | |
| 1593127 | 7/1981 | United Kingdom. | |

Primary Examiner—Richard V. Fisher
Assistant Examiner—Linda S. Evans
Attorney, Agent, or Firm—William R. Hinds

[57] ABSTRACT

A method of treating a liquid, for example dewatering a sludge by ultrafiltration, in which the liquid is caused to flow repeatedly along a permeable walled tube (22) so that a filtrate passes through the wall of the tube, the progress of the treatment being monitored by monitoring the pressure difference between the ends of the tube (22). The method has enabled sludges of widely varying compositions to be dewatered to produce products of uniform viscosity, suitable for subsequent immobilization by cementation.

7 Claims, 1 Drawing Sheet

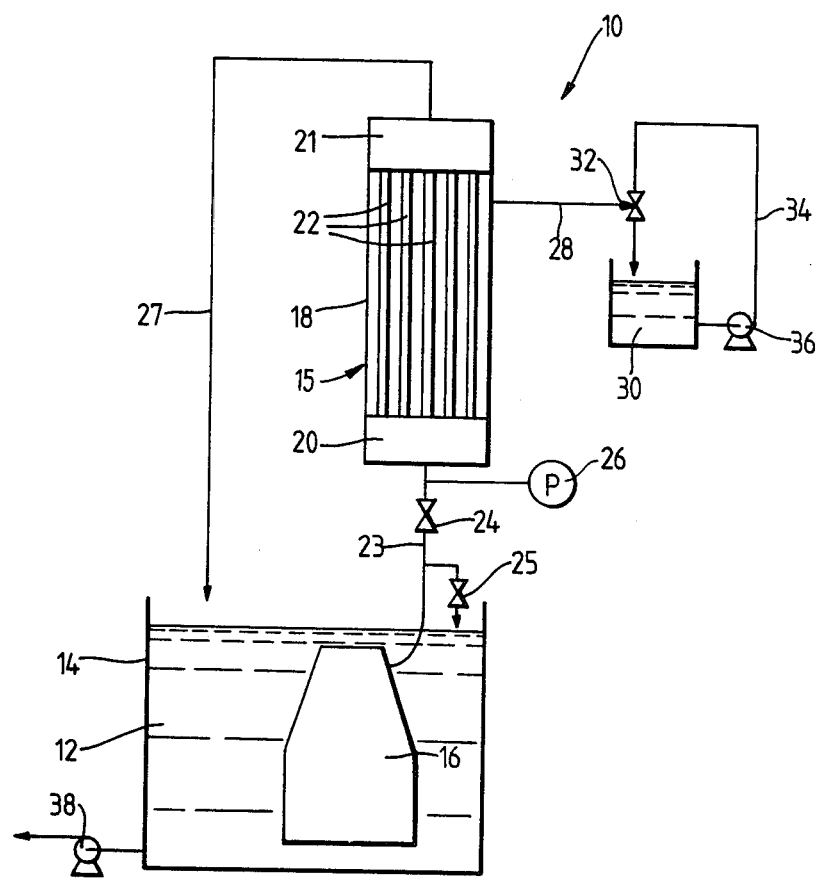

4,774,002

LIQUID TREATMENT SUCH AS DEWATERING OF SLUDGE

FIELD OF THE INVENTION

This invention relates to a method of liquid treatment, utilizing one or more ducts through which a liquid is passed, each duct having a wall permeable to a component of the liquid, particularly but not exclusively for ultrafiltration, and to an apparatus for performing the method.

BACKGROUND OF THE INVENTION

A known ultrafiltration apparatus, described in British Pat. No. GB 1 468 928 (Union Carbide Corp.), comprises a plurality of parallel tubes arranged so that a liquid to be treated passes under pressure axially through the tubes. The tubes are porous and permeable, being composed of bonded carbon particles and an essentially continuous coating of metal oxide particles on the inside surface of the tubes. In operation of the apparatus some of the liquid and low molecular weight dissolved phases pass through the walls of the tubes, while most of the higher molecular weight dissolved phases and any particulate matter are carried through the tubes in the liquid concentrate.

Such an apparatus may be used to separate water from an oil/water or oil/water/dirt emulsion. Equally it may be used to remove water from a sludge of particulate matter and water. For example it might be used to dewater a sludge containing low-level radioactive material, before immobilizing the sludge by the addition of cement. In such a method it may be advantageous to monitor the degree of dewatering so as to ensure that the solids concentration of the sludge reaches an appropriate final value, and such monitoring must be able to cope with wide variations in the nature of the initial sludge, for example its chemical composition, solids concentration or particle size.

SUMMARY OF THE INVENTION

The present invention accordingly provides a method of treatment of a liquid, wherein the liquid is caused to flow repeatedly along a duct with a wall permeable to a component of the liquid so that on each passage of the liquid along the duct, as a result of a pressure difference between the inside and the outside of the duct, a filtrate passes through the wall of the duct and the remainder of the liquid passes along the duct, the method including monitoring the pressure difference between the ends of the duct and controlling the treatment in accordance with the value of the pressure difference.

The treatment may be terminated when the pressure difference reaches a predetermined value. The value of the pressure difference depends to a large extent on the viscosity of the liquid, so that the method enables different liquids to be treated and concentrated to provide a final liquid of a desired viscosity.

The method may also include a cleaning operation comprising reversing the pressure difference between the inside and the outside of the duct so that filtrate passes back through the permeable wall, to flow along the duct along with the liquid, the cleaning operation being performed in accordance with the value of the pressure difference.

The invention also provides a liquid treatment apparatus comprising at least one duct for the passage of a liquid, the duct having a wall permeable to a component of the liquid, means to cause the liquid to flow repeatedly along the duct so that on each passage of the liquid along the duct a filtrate passes through the wall of the duct, and means for monitoring the pressure difference between the ends of the duct and for controlling the operation of the apparatus in accordance with the value of the pressure difference.

BRIEF DESCRIPTION OF THE DRAWING

The invention will now be further described by way of example only and with reference to the accompanying drawing, which shows a diagrammatic view of a ultrafiltration apparatus incorporating the invention.

DESCRIPTION OF THE PREFERRED EMBODIMENTS

Referring to the drawing, an ultrafiltration apparatus 10 is shown for dewatering an aqueous sludge 12 held in a tank 14. The apparatus 10 comprises a centrifugal pump 16 immersed in the tank 14, and an ultrafiltration module 15 consisting of a housing 18 with header tanks 20 and 21 at each end for the sludge, and a large number of parallel ultrafiltration tubes 22. (only five are shown) extending through the housing 18 between the headers 20 and 21. Each tube 22 is porous and permeable, composed of bonded carbon particles and with an essentially continuous coating of metal oxide particles on its inside surface. The metal oxide coating is porous, but the pores are smaller than those between the carbon particles, so that the pores effectively increase in size from the inside of the tube outwards. The pump 16 is connected to one header 20 by a pipe 23, including a throttle valve 24 (usually open), a branch from the pipe 23 between the pump 16 and the throttle valve 24 leading to a recirculation valve 25 (usually closed). A pressure gauge 26 is connected to the pipe 23 between the throttle valve 24 and the header 20, and so measures the pressure of the sludge flowing into the ultrafiltration module 15. An open-ended pipe 27 conveys the treated sludge from the other header 21 back to the tank 14 for recirculation by the pump 16. A pipe 28 connects the housing 18 to a filtrate water tank 30 via a three-port valve 32; and a pipe 34 and a backwash pump 36 connect the water tank 30 to the third port of the valve 32. A pump 38 connected to the bottom of the tank 14 enables the tank 14 to be emptied.

In operation of the apparatus 10, a batch of aqueous sludge 12 to be treated is introduced into the tank 14, and is pumped through the ultrafiltration module 15 by the pump 16, returning via the pipe 27 and being recirculated. The pressure within the tubes 22 is on average about 500 kPa while the pressure within the housing 18 is about atmospheric pressure (100 kPa), and the consequent pressure difference between the inside and the outside of the tubes 22 causes water to pass through the porous walls of the tubes 22 into the housing 18. This filtrate flows through the pipe 28 and the three-port valve 32 to the filtrate water tank 30. The circulating sludge is thus gradually dewatered.

There is of course a pressure drop along the length of the tubes 22, due to the viscosity of the sludge 12. The pressure is highest in the input header 20, where the pressure has the value measured by the pressure gauge 26; and is lowest in the other header 21 where, because the pipe 27 is open-ended and offers little resistance (in comparison to the module 15) to the flow of sludge 12, the pressure is only slightly above atmospheric pressure. The value of the pressure as measured by the gauge 26 is therefore a measure of the pressure difference between the ends of the tubes 22. The degree of dewatering of the sludge 12 affects its viscosity, and consequently the measured pressure provides an indication of the degree of dewatering. Operation of the apparatus 10 is therefore continued until the pressure indicated by the gauge 26 reaches a predetermined value, and the tank 14 is then emptied of that batch of sludge 12 by means of the pump 38. Treatment of another batch can then commence.

It has been found that this process enables sludges of widely varying particle sizes (from less than 1 μm to more than 2 mm), widely varying concentrations (from less than 1 wt % to more than 20 wt %), and of different chemical compositions (e.g. ferric hydroxide, magnesium oxide or sodium diuranate) to be dewatered to give products which are of substantially uniform viscosity and are suitable for immobilization by mixing with cement powder.

After a batch of sludge 12 has been dewatered as described above, it is desirable to remove any sludge deposits from the inside walls of the tubes 22 by a cleaning operation, before treating the next batch. The cleaning operation entails partly closing the throttle valve 24 and opening the recirculation valve 25 so as to reduce the rate of flow of sludge 12 along the tubes 22, and to reduce the average pressure within the tubes 22 to about 100 kPa. At the same time the backwash pump 36 is energised and the three-port valve 32 operated so that filtrate from the tank 30 is pumped into the housing 18, raising the pressure in the housing 18 to about 100 kPa above the pressure within the tubes 22. The pressure difference between the inside and the outside of the tubes 22 is thus reversed, and so filtrate water passes back through the tube walls, removing any deposits from the inside surfaces and acting as a lubricant so that the deposits are carried along the tubes 22 with the sludge flow, to pass back to the tank 14 along the tube 27. The cleaning operation is performed for just a few minutes, and then ordinary operation can be resumed.

It will be appreciated that the cleaning operation may also be performed at intervals during the dewatering of a batch of sludge 12, as well as between successive batches, and that the cleaning operation may be performed in accordance with the measured values of pressure, for example if the pressure measured by the gauge 26 rises more rapidly than expected owing to a partial blockage of the tubes 22 by deposited sludge. The use of the cleaning operation has been found to cause no damage to the porous metal oxide coating inside the tubes 22, and it has also been found to enable a greater degree of dewatering of sludges to be achieved.

We claim:

1. A method of treatment of a liquid, wherein the liquid is caused to flow repeatedly along a duct with a wall permeable to a component of the liquid so that on each passage of the liquid along the duct, as a result of a pressure difference between the inside and the outside of the duct, a filtrate passes through the wall of the duct to increase the viscosity of the remaining liquid and the remainder of the liquid passes along the duct such that the viscosity of the liquid is increased as it passes repeatedly along the duct, the method including monitoring the pressure difference between the ends of the duct as an indication of the viscosity of the liquid and controlling the treatment in accordance with the value of the monitored pressure difference and hence the indicated increase in viscosity.

2. A method as claimed in claim 1 wherein the treatment is terminated when the monitored pressure difference reaches a predetermined value indicative of a predetermined degree of filtrate removal and a resulting desired viscosity.

3. A method as claimed in claim 2 also including a cleaning operation comprising reversing the pressure difference between the inside and the outside of the duct so that filtrate passes back through the permeable wall, to flow along the duct along with the liquid, the cleaning operation being performed in accordance with the value of the monitored pressure difference.

4. A method as claimed in claim 1 also including a cleaning operation comprising reversing the pressure difference between the inside and the outside of the duct so that filtrate passes back through the permeable wall, to flow along the duct along with the liquid, the cleaning operation being performed in accordance with the value of the monitored pressure difference.

5. A method as claimed in claim 1 wherein said liquid is a sludge of particulate matter and water, said treatment is a dewatering treatment of the sludge, and said treatment is terminated when the monitored pressure difference reaches a predetermined value indicative of a predetermined degree of dewatering and hence a resulting predetermined viscosity.

6. A method of treating a sludge of particulate matter and water, wherein the sludge is dewatered by causing the sludge to flow repeatedly along a duct with a wall permeable to the water so that on each passage of the sludge along the duct, as a result of a pressure difference between the inside and the outside of the duct, water filtrate passes through the wall of the duct and the remainder of the sludge passes along the duct, the method including monitoring the pressure difference between the ends of the duct and controlling the dewatering treatment in accordance with the value of the monitored pressure difference, terminating the dewatering treatment when the monitored pressure difference reaches a predetermined value indicative of a predetermined degree of dewatering and a resulting desired viscosity suitable for immobilization by cementation, mixing the sludge with cement, and letting the mixture set solid.

7. A method as claimed in claim 6 wherein the particulate matter in the sludge includes radioactive material.

* * * * *